Aug. 12, 1924.

W. C. HATTES 1,504,473

MILK BOTTLE

Filed Oct. 27, 1923

Inventor
Walter C. Hattes
By Lancaster Allwine
Attorney

Patented Aug. 12, 1924.

1,504,473

UNITED STATES PATENT OFFICE.

WALTER C. HATTES, OF PORTSMOUTH, VIRGINIA.

MILK BOTTLE.

Application filed October 27, 1923. Serial No. 671,157.

*To all whom it may concern:*

Be it known that I, WALTER C. HATTES, a citizen of the United States, residing at Portsmouth, in the county of Norfolk and State of Virginia, have invented certain new and useful Improvements in a Milk Bottle, of which the following is a specification.

This invention relates to improvements in milk bottles.

The primary object of this invention is the provision of a milk bottle embodying a novel construction whereby to facilitate the drinking of the contents directly therefrom.

A further object of this invention is the provision of a conventional milk bottle having the mouth portion thereof so shaped as to permit the easy pouring of contents therefrom.

A further object of this invention is the provision of the conventional type of milk bottle having the mouth portion thereof so shaped as to facilitate the extraction or placing of a cap with respect to the bottle.

A further object of this invention is the provision of a conventional type of milk bottle having the mouth portion thereof recessed at one side whereby to facilitate handling of the contents of the bottle.

Other objects and advantages of this invention will be apparent during the course of the following detailed description.

In the drawing, wherein similar reference characters designate corresponding parts throughout the several views.

Figure 1:
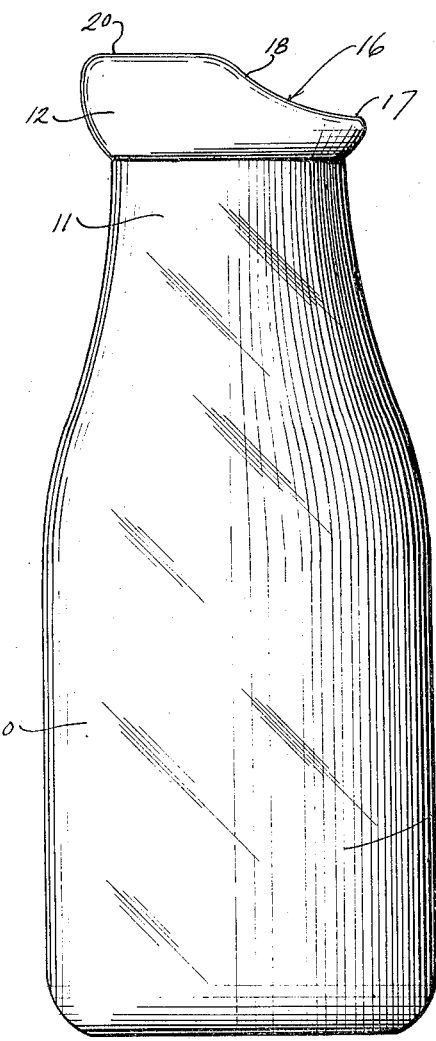
Figure 1 is a side elevation of the improved milk bottle.

In the drawing, wherein for the purpose of illustration is shown but the preferred embodiment of this invention, the letter A may generally designate the improved milk bottle, which may include a body portion 10; neck portion 11; and mouth portion 12. The body portion 10 and neck portion 11 of the milk bottle A are preferably of the conventional construction. Somewhere adjacent the juncture of the milk bottle neck 11 with the mouth portion 12 the cap seating shoulder 13 is preferably provided, extending about the opening 14 of the milk bottle A, and upon which the conventional cap B may seat to prevent displacement of the contents of the bottle A.

The mouth portion 12 of the body A is of novel formation, and it is preferred that the mouth portion 12 be of a height substantially greater than it is customary to form the mouth portions of milk bottles as now used. This mouth portion 12, at one side thereof is provided with a recess 16, the bottom marginal edge 17 of which recess extends immediately above the cap seating shoulder 13. The edges of the recess 16 extend from the bottom edge 17 upward in sloping relation, as at 18, to join the top marginal edge 20 of the mouth portion 12; the top marginal edge 20 of the mouth portion 12 being the normal top edge of the mouth portion of a milk bottle, and which is preferably disposed in a plane parallel with the plane in which the cap B is normally placed.

Referring to the advantages which accrue from the formation of the mouth portion 12 of the milk bottle A with the recess 16 above mentioned, in the first place it facilitates drinking of the contents of the bottle directly therefrom. It is a custom throughout the country to sell milk and cream in manufacturing plants, offices, and in like places directly in the bottles, during lunch periods, and the contents are drunk directly from the bottle. It is well known that it is difficult to drink from the ordinary milk bottle after a portion of the contents have been removed, incident to the fact that the mouth portion of the bottle is relatively narrow, and with one side of the mouth portion in the mouth or between the lips of a user, the other or opposite side of the mouth portion generally engages the nose of the drinker, and makes drinking of the contents directly from the bottle an inconvenience at the best. However, with the use of the mouth portion 12 upon the milk bottle A, the drinker may place his lips over the mouth portion 12 at the conventional top marginal portion 20 thereof, and the bottle may be tipped completely upsidedown without interfering to material extent with the drinking operation, incident to the fact that the recessed portion 16 of the mouth will receive the nose of the drinker and do away with the necessity of the drinker tipping his or her head extremely to the rear in order to drain the contents of the bottle, as is necessary when drinking from the conventional milk bottle.

In the second place the milk bottle with the recess 16 affords a convenience for the pouring of the contents of the bottle therefrom, as the recess portion 16 may be used as a spout, so to speak, to permit the facile pouring of the contents of the bottle therefrom.

Figure 2:
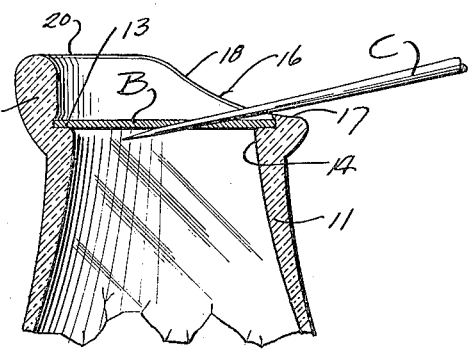
Figure 2 is a cross sectional view taken through the upper portion of the milk bottle showing the manner in which the improved construction will permit the facile extraction of a cap therefrom.
Figure 3:
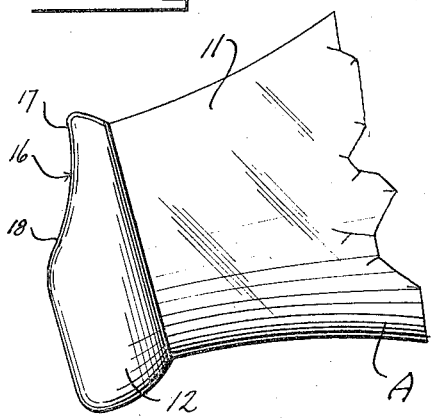
Figure 3 is a fragmentary view of the milk bottle, showing more particularly the upper portion thereof in the position which the same will assume when a person is drinking the contents of the bottle, showing the manner in which the novel construction of the milk bottle will better enable the drinking of the contents directly from the bottle.

It is well known that the height of the mouth portion of the ordinary milk bottle necessitates that a tool used for removing the cap B direct its force downwardly toward the center of the milk container, and very often the force applied is too great and the cap is suddenly plunged into the contents of the bottle and the contents displaced. However, with the provision of the milk bottle A having the recessed portion 16 in the mouth 12 thereof, it is enabled to use a cap removing tool C, in the manner illustrated in Figure 2 of the drawing; the tool C being inserted side wise through the recessed portion 16, in substantially a horizontal position, so that the pointed shank thereof may be directed at an acute angle into the cap B; the acute angle being much more acute than it is possible to insert a similar tool in the conventional type of milk bottle, as is obvious.

From the foregoing description of this invention it is apparent that a milk bottle has been provided which affords numerous conveniences over the milk bottle as now in conventional use.

Various changes in the shape, size, and arrangement of parts may be made to the form of this invention, without departing from the spirit of the invention or the scope of the claim.

I claim:

As an article of manufacture, a bottle comprising a body portion, a constricted neck portion, and an outwardly bulging mouth portion, said mouth portion adjacent the neck portion having an inwardly extending cap seating shoulder therein extending completely around the mouth portion to retain a circular cap therein, said mouth portion for a portion of the circumference of the neck being of a height sufficient to permit of its insertion in the mouth of the drinker and having its ends tapered downwardly and merging into a flat edge portion positioned in a plane above the shoulder and extending circumferentially of the neck between the tapered ends a sufficient distance to readily receive the nose of a person drinking from the bottle.

WALTER C. HATTES.